United States Patent
Weiner et al.

(10) Patent No.: US 9,921,355 B2
(45) Date of Patent: Mar. 20, 2018

(54) CHIRAL FIBER APPARATUS AND METHOD FOR CONTROLLABLE LIGHT EXTRACTION FROM OPTICAL WAVEGUIDES

(71) Applicant: Chiral Photonics, Inc., Pine Brook, NJ (US)

(72) Inventors: Gary Weiner, Bedminster, NJ (US); Victor Il'ich Kopp, Fair Lawn, NJ (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 15/612,479

(22) Filed: Jun. 2, 2017

(65) Prior Publication Data
US 2017/0269277 A1    Sep. 21, 2017

Related U.S. Application Data

(63) Continuation of application No. 13/149,073, filed on May 31, 2011, now abandoned.
(Continued)

(51) Int. Cl.
*G02B 6/00* (2006.01)
*F21V 8/00* (2006.01)
(Continued)

(52) U.S. Cl.
CPC ............... *G02B 6/001* (2013.01); *F21K 9/61* (2016.08); *F21K 9/232* (2016.08); *F21K 9/27* (2016.08); *F21Y 2115/10* (2016.08); *G02B 6/305* (2013.01)

(58) Field of Classification Search
CPC ........... F21K 9/61; F21K 9/232; G02B 6/001; G02B 6/305
See application file for complete search history.

(56) References Cited

U.S. PATENT DOCUMENTS

| 6,396,859 B1 | 5/2002 | Kopp et al. |
| 6,404,789 B1 | 6/2002 | Kopp et al. |

(Continued)

FOREIGN PATENT DOCUMENTS

| WO | WO 2002/073247 A2 | 9/2002 |
| WO | WO 2006/046947 A2 | 5/2006 |

(Continued)

*Primary Examiner* — Anabel Ton
(74) *Attorney, Agent, or Firm* — Knobbe, Martens, Olson & Bear LLP

(57) ABSTRACT

The system and method of the present invention advantageously enable controllable light extraction from optical fiber waveguides and offer highly configurable light signal guidance and control capabilities, as well as additional advantageous features associated with waveguides, by providing, in various exemplary embodiments thereof, a multitude of novel techniques by which the parameters relating to utilization of various light signals (such as direction of their emission, magnitude of the emission, physical surface area of the emission, etc.), can be readily controlled and configured as a matter of design choice. Additionally, the inventive system and method, in various exemplary embodiments thereof, also enable and facilitate selective configuration of, and/or control over, various characteristics of the light signals guided/controlled/extracted thereby, such as the signals' wavelength, polarization, intensity, amplitude, etc. To achieve the above-noted beneficial functions, the system and method of the present invention utilize a physical property of a standard, or a specialty, chiral optical fiber to scatter light signals entering the fiber in directions away from the fiber core (through the fiber cladding), to thereby (Continued)

advantageously enable selective and controllable extraction of light signals of a desired predetermined wavelength (or, optionally of a predetermined range of wavelengths) therefrom.

4 Claims, 2 Drawing Sheets

Related U.S. Application Data

(60) Provisional application No. 61/349,256, filed on May 28, 2010.

(51) Int. Cl.
*F21K 9/61* (2016.01)
*F21K 9/232* (2016.01)
*F21Y 115/10* (2016.01)
*F21K 9/27* (2016.01)
*G02B 6/30* (2006.01)

(56) References Cited

U.S. PATENT DOCUMENTS

| | | | |
|---|---|---|---|
| 6,411,635 | B1 | 6/2002 | Kopp et al. |
| 6,428,198 | B1 * | 8/2002 | Saccomanno ........ G02B 6/0006 362/552 |
| 6,671,293 | B2 | 12/2003 | Kopp et al. |
| 6,678,297 | B2 | 1/2004 | Kopp et al. |
| 6,721,469 | B2 | 4/2004 | Kopp et al. |
| 6,741,631 | B2 | 5/2004 | Kopp et al. |
| 6,744,943 | B2 | 6/2004 | Kopp et al. |
| 6,792,169 | B2 | 9/2004 | Kopp et al. |
| 6,839,486 | B2 | 1/2005 | Kopp et al. |
| 6,875,276 | B2 | 4/2005 | Shibayev et al. |
| 6,891,992 | B2 | 5/2005 | Kopp et al. |
| 6,925,230 | B2 | 8/2005 | Kopp et al. |
| 7,009,679 | B2 | 3/2006 | Kopp et al. |
| 7,095,911 | B2 | 8/2006 | Kopp et al. |
| 7,142,280 | B2 | 11/2006 | Kopp et al. |
| 7,242,702 | B2 | 7/2007 | Kopp et al. |
| 7,308,173 | B2 | 12/2007 | Kopp et al. |
| 7,463,800 | B2 | 12/2008 | Kopp et al. |
| 7,983,515 | B2 | 7/2011 | Zhang et al. |
| 8,218,921 | B2 | 7/2012 | Kopp et al. |
| 8,326,099 | B2 | 12/2012 | Singer et al. |
| 8,457,456 | B2 | 6/2013 | Kopp et al. |
| 8,463,094 | B2 | 6/2013 | Kopp et al. |
| 8,712,199 | B2 | 4/2014 | Kopp et al. |
| 8,948,547 | B2 | 2/2015 | Kopp |
| 9,766,407 | B2 | 9/2017 | Weiner et al. |
| 2002/0003827 | A1 | 1/2002 | Genack et al. |
| 2002/0069676 | A1 | 6/2002 | Kopp et al. |
| 2002/0118710 | A1 | 8/2002 | Kopp et al. |
| 2002/0172461 | A1 | 11/2002 | Singer et al. |
| 2003/0118285 | A1 | 6/2003 | Kopp et al. |
| 2004/0145704 | A1 | 7/2004 | Kopp et al. |
| 2008/0098772 | A1 | 5/2008 | Kopp et al. |
| 2009/0324159 | A1 | 12/2009 | Kopp et al. |
| 2010/0002983 | A1 | 1/2010 | Kopp et al. |
| 2010/0158438 | A1 | 6/2010 | Churikov et al. |
| 2011/0292676 | A1 | 12/2011 | Weiner et al. |
| 2011/0293219 | A1 | 12/2011 | Weiner et al. |
| 2012/0189241 | A1 | 7/2012 | Kopp et al. |
| 2012/0257857 | A1 | 10/2012 | Kopp et al. |
| 2013/0121641 | A1 | 5/2013 | Singer et al. |
| 2013/0188174 | A1 | 7/2013 | Kopp et al. |
| 2013/0188175 | A1 | 7/2013 | Kopp et al. |
| 2013/0216184 | A1 | 8/2013 | Kopp et al. |
| 2014/0294345 | A1 | 10/2014 | Kopp et al. |
| 2015/0212274 | A1 | 7/2015 | Kopp |
| 2017/0184791 | A1 | 6/2017 | Kopp et al. |
| 2017/0192176 | A1 | 7/2017 | Kopp |
| 2017/0219774 | A1 | 8/2017 | Kopp |
| 2017/0227716 | A1 | 8/2017 | Kopp |
| 2017/0268937 | A1 | 9/2017 | Kopp et al. |
| 2017/0269293 | A1 | 9/2017 | Churikov et al. |
| 2017/0276867 | A1 | 9/2017 | Kopp |

FOREIGN PATENT DOCUMENTS

| | | |
|---|---|---|
| WO | WO 2008/080174 A1 | 7/2008 |
| WO | WO 2017/053479 A1 | 3/2017 |
| WO | WO 2017/100667 A1 | 6/2017 |

* cited by examiner

CHIRAL FIBER APPARATUS AND METHOD FOR CONTROLLABLE LIGHT EXTRACTION FROM OPTICAL WAVEGUIDES

CROSS REFERENCE TO RELATED APPLICATIONS

The present patent application is a continuation of U.S. application Ser. No. 13/149,073, entitled "Chiral Fiber Apparatus and Method for Controllable Light Extraction from Optical Waveguides," filed May 31, 2011, which claims priority benefit from the commonly assigned U.S. provisional patent application 61/349,256 entitled "Chiral Fiber Apparatus and Method for Controllable Light Extraction from Optical Waveguides", filed May 28, 2010.

BACKGROUND OF THE INVENTION

There is an ever-growing need in modern and cutting edge communication, display, lighting, and other applications, for various techniques and approaches for guiding, controlling, and emission of light signals. However, while solutions for simple emission of predetermined light signals from appropriately configured devices (such as LEDs, etc.), and for basic transport of light signals via conventional waveguides are in common use, the previously known solutions have very significant limitations both in the degree of control that can be exercised over the guidance and emission of light signals as well as in the level of control/configurability of the characteristics/properties of the light signals themselves.

Accordingly, it would be very advantageous to provide various novel techniques by which light signals could be guided and extracted (for redirection, for coupling to other devices/systems, for emission, or for other predefined purposes). It would also be useful to provide various solutions by which the parameters relating to utilization of various light signals (such as direction of their emission, magnitude of emission, physical area of the emission) can be readily controlled and configured as a matter of design choice. It would further be useful to provide various systems and methods to enable selective configuration of, and/or control over, various characteristics of guided/extracted light signals, such as their wavelength, polarization, intensity, amplitude, etc.

BRIEF DESCRIPTION OF THE DRAWINGS

In the drawings, wherein like reference characters denote corresponding or similar elements throughout the various figures.

SUMMARY OF THE INVENTION

Figure 1A:
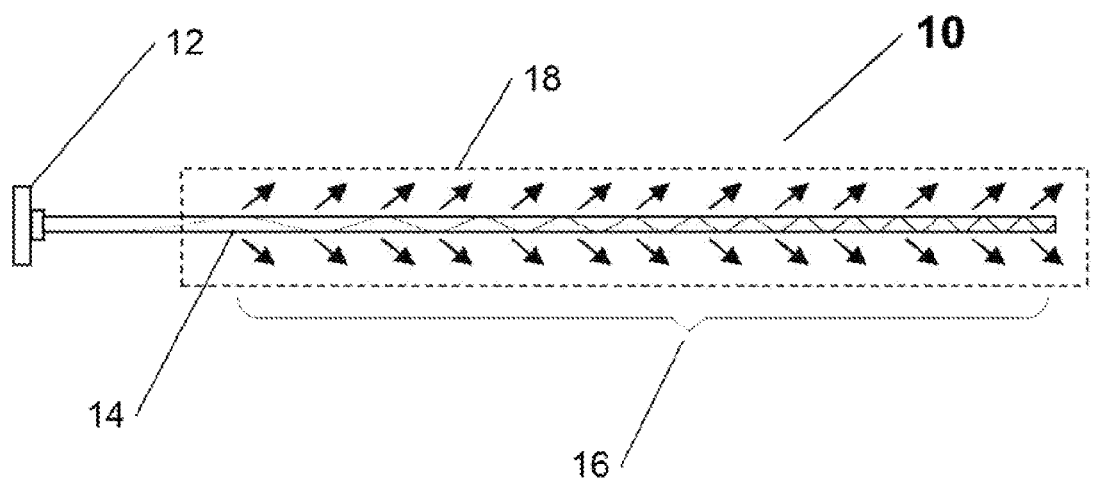
FIG. 1A shows a schematic block diagram representative of a first exemplary embodiment of a novel fiber waveguide of the present invention in an elongated configuration.

The system and method of the present invention advantageously overcome and address the drawbacks of previously known light signal guidance and control solutions in various applications, and provide additional new benefits and novel features, enabling new applications and uses for systems and components with highly configurable light signal guidance, control, and extraction capabilities, and additional advantageous features related to waveguides.

The inventive system and method, in various exemplary embodiments thereof, also provide a multitude of novel techniques by which the parameters relating to utilization of various light signals (such as direction of their emission, magnitude of the emission, physical surface area of the emission, etc.), can be readily controlled and configured as a matter of design choice, without departing from the spirit of the invention. Additionally, the inventive system and method, in various exemplary embodiments thereof, also enable and facilitate selective configuration of, and/or control over, various characteristics of the light signals guided/controlled/extracted thereby, such as the signals' wavelength, polarization, intensity, amplitude, etc.

In summary, the system and method of the present invention utilize a physical property of a standard or a specialty chiral optical fiber to scatter light signals entering the fiber in directions away from the fiber core (through the fiber cladding), to thereby advantageously enable selective and controllable extraction of light signals of a desired predetermined wavelength (or, optionally of a predetermined range of wavelengths) therefrom.

In a first exemplary embodiment of the present invention, the novel fiber waveguide comprises an elongated configuration connected to a light source at one end (e.g., an LED, etc.), that is operable to achieve substantially uniform light scattering of the light signal emitted by the light source along at least a portion of its length.

In an alternate exemplary embodiment of the present invention, a novel fiber waveguide system comprises at least one fiber waveguide sub-component positioned near one another in a substantially planar configuration, each proximal to a planar diffuser, such that the inventive planar waveguide system is operable to achieve substantially uniform light scattering along each fiber waveguide sub-component and then through the planar diffuser, and thereby serve as a planar light emission source, that is substantially uniform across the planar diffuser surface area (e.g., for use as a display backlight, etc.).

In a second exemplary embodiment of the present invention, the novel fiber waveguide comprises a geometrically selectable configuration (e.g., assembled into a desired predefined two or three dimensional geometric form, or configured to be flexible, or segmented and repositionable, etc.), wherein the inventive fiber waveguide is operable to be selectively configured to, at least: (1) achieve the functionality of the fiber waveguide of FIG. 1A, (2) when positioned proximally to a planar diffuser, to further achieve the functionality of the fiber waveguide of FIG. 1B; and (3) when positioned inside a light diffuser (or equivalent housing), to achieve functionality equivalent to a conventional light source.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE INVENTION

The system and method of the present invention advantageously overcome and address the drawbacks of previously known light signal guidance, control, and emission solutions in a wide range of applications, and provide additional new benefits and novel features, enabling new applications and uses for light emission systems and components with highly configurable light signal guidance, control, and extraction capabilities, while providing additional advantageous features typically possessed by waveguides (such as flexible low-loss coupling functionality to other systems/components, selective directed light signal emission, etc.).

The inventive system and method, in various exemplary embodiments thereof, also provide a multitude of novel techniques by which the parameters relating to utilization of various light signals (such as direction of their emission, magnitude of the emission, physical surface area of the emission, etc.), can be readily controlled and configured as a matter of design choice, without departing from the spirit of the invention. Additionally, the inventive system and method, in various exemplary embodiments thereof, also enable and facilitate selective configuration of, and/or control over, various characteristics of the light signals guided/controlled/extracted thereby, such as the signals' wavelength, polarization, intensity, amplitude, etc.

Essentially, the system and method of the present invention utilize a physical property of a standard or a specialty chiral optical fiber (hereinafter individually and collectively referred to as "Fiber Waveguide(s)", to scatter light signals entering the fiber in directions away from the fiber core (through the fiber cladding), to thereby advantageously enable selective and controllable extraction of light signals of a desired predetermined wavelength (or, optionally of a predetermined range of wavelengths) therefrom.

The specialty chiral optical fibers that may be advantageously utilized in connection with the present invention, include, but are not limited to, the various chiral fibers and chiral fiber-based components, such as are disclosed in the U.S. Pat. No. 6,839,486 entitled "Chiral Fiber Grating", and U.S. Pat. No. 6,925,230 entitled "Long Period Chiral Fiber Grating Apparatus", and in the U.S. patent application Ser. No. 12/502,651, entitled "Dual Twist Single Helix Optical Fiber Grating". These references offer particular insight into the various key characteristics, properties, and functions of specialty chiral optical fibers, that facilitate the various novel features and elements of the inventive system and method. Certainly other types of waveguides (fiber-based and otherwise) with similar/equivalent chiral properties to the fibers and components described in the above references can be readily used to practice the various inventive embodiments hereof, without departing from the spirit of the invention.

However, because the greatest range of advantageous novel features in accordance with the present invention are available with utilization of specialty chiral fiber waveguides, for the sake of convenience the description of various embodiments of the present invention described below, presumes, by way of illustrative example only, that the Fiber Waveguides being utilized have some form of chiral properties.

The light signal scattering effect of Fiber Waveguides may be configured to be either "polarization selective" or "polarization insensitive", based on the symmetry of the fiber being utilized (for example, use of a single helix fiber results in a "polarization insensitive" scattering waveguide configuration, while use of a double helix fiber results in "polarization selective" scattering waveguide configuration). In either case, the amount of light scattered over a given length of a Fiber Waveguide can be readily controlled as a matter of design choice by selecting a corresponding helical pitch profile along the longitudinal axis of the fiber. It should also be noted that appropriate selection of the Fiber Waveguide's longitudinal helical pitch profile will also advantageously enable control over, and selection of, the direction in which the light signals are scattered as they move through the fiber.

Accordingly, a Fiber Waveguide optimized for one or more specific applications, and having a predetermined profile of intensity and polarization of scattered light signals passing therethrough, can be advantageously achieved by selecting: (1) an appropriate fiber to serve as a waveguide, (2) a method of waveguide manufacturing (e.g., such as a single or dual twist fabrication technique, or other manufacturing approaches not related to fiber twisting), and (3) selectively varying the helical pitch along the longitudinal axis of the fiber.

The Fiber Waveguide may be made form a wide range of materials, including, but not limited to, glass or polymer. The Fiber Waveguide can also be readily adapted for a multitude of different implementations, for example: it can be coupled in an end-to-end manner with a light source (such as one or more LEDs) directly, or with one or more lens may be utilized as part of the coupling interface. In another exemplary embodiment of the present invention, one light source may be coupled to more than one Fiber Waveguide, or more than one light source may be coupled to a Fiber Waveguide.

Referring now to FIG. 1A, a first exemplary embodiment of the Fiber Waveguide is shown as a novel Fiber Waveguide system 10 which comprises an elongated fiber waveguide element 14 (e.g., such as a chiral fiber device or equivalent), that is connected at one end to a light source 12 (e.g., one or more LEDs, etc.), with the fiber waveguide element 14 comprising a longitudinal pitch profile selected and configured to enable the system 10 to achieve substantially uniform light scattering 16 of light signal emitted by the light source 12 along at least a portion of the waveguide element 14 length. In one embodiment of the present invention, the longitudinal pitch profile comprises a monotonically reduced helical pitch along the waveguide element 14 length. In one alternate embodiment of the present invention, the fiber waveguide element 14 may optionally be surrounded by an elongated (e.g., cylindrical) light diffuser 18, to achieve light emission properties that enable the Fiber Waveguide system 10 to emulate, and to serve as a replacement of, conventional fluorescent (or other) light bulbs.

Figure 1B:
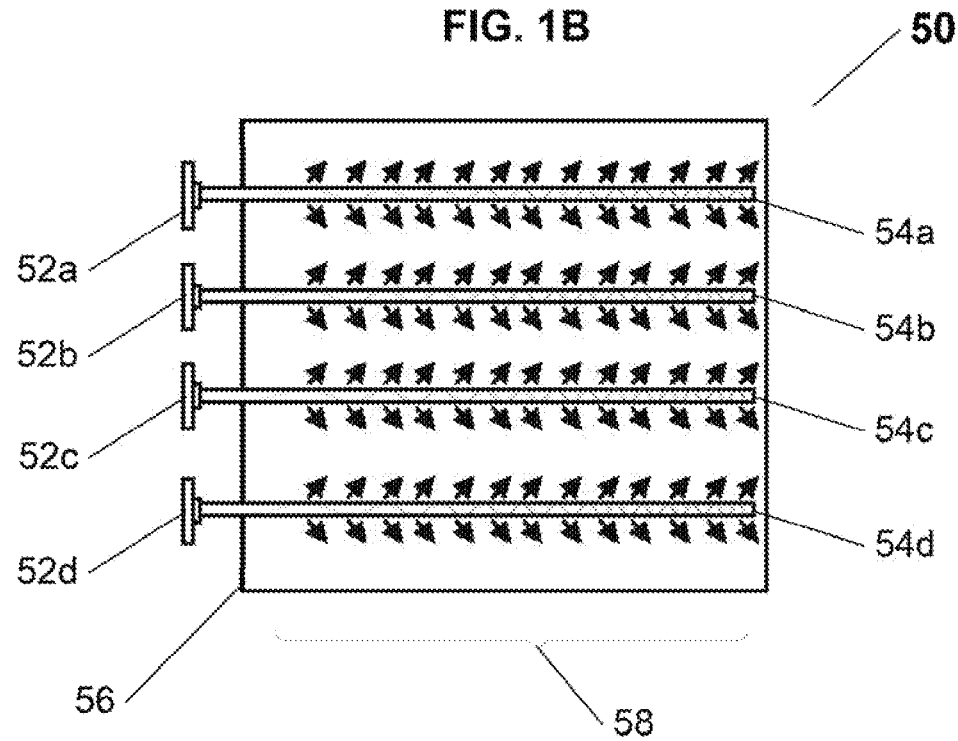
FIG. 1B shows a schematic block diagram representative of an exemplary embodiment of a novel fiber waveguide system of the present invention, comprising plural fiber waveguide sub-component in a substantially planar configuration.

Referring now to FIG. 1B, an exemplary inventive embodiment of a Fiber Waveguide-based light emission system is shown as a planar Fiber Waveguide system 50, preferably having a plurality of fiber waveguide sub-components (shown in FIG. 1B, by way of example only as four plural fiber waveguide sub-components 54a to 54b), that are positioned near one another in a substantially planar configuration, each connected to a corresponding light source 52a to 52d (which may comprise individual light sources or one or more shared light sources), and each proximal to a planar diffuser 56, such that the inventive planar waveguide system 50 is operable, when the light sources 52a to 52d are active, to achieve substantially uniform light scattering 58 along each fiber waveguide sub-component 54a to 54d, and then through the planar diffuser 56, and to thereby serve as a planar light emission source, that is substantially uniform across the planar diffuser 56 surface area, such that the system 50 may advantageously serve as a highly efficient uniform backlight for different types of displays, or may also be used for various other lighting applications. While a plurality of fiber waveguide sub-components 54a to 54d are shown in FIG. 1B, it should be understood to one skilled in the art that one or more fiber waveguide sub-components may be readily utilized in the system 50 in accordance with the present invention, and without departing from the spirit thereof, to readily achieve a desired uniform light emission result. In at least one embodiment of the present invention, each fiber waveguide subcomponent 54a to 54d, may comprise an individual fiber waveguide element equivalent to fiber waveguide element 14 of FIG. 1A.

Figure 1C:
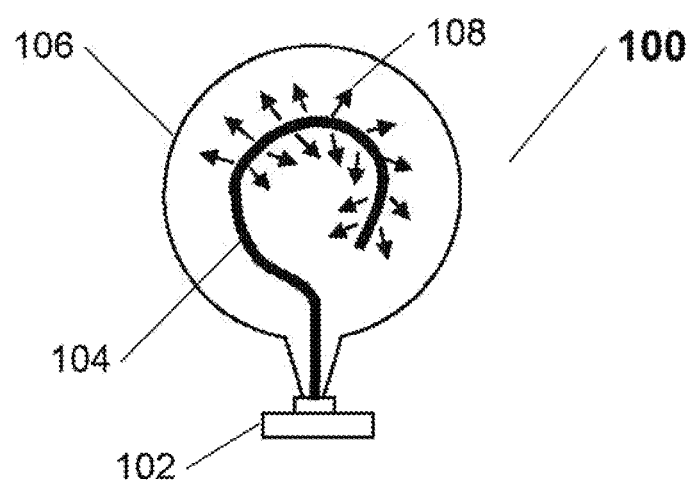
FIG. 1C shows a schematic block diagram representative of a second exemplary embodiment of a novel fiber waveguide of the present invention in a geometrically selectable configuration.

Referring now to FIG. 1C, a second exemplary embodiment of the Fiber Waveguide is shown as a novel Fiber Waveguide system 100 which comprises a light source 102, connected to one end of a geometrically configurable fiber waveguide element 104 (e.g., such as a chiral fiber device or equivalent, or a plurality of sequentially connected chiral fiber devices, etc.), which may be fabricated into a desired predefined two or three dimensional geometric form, or which may be operable to change its geometric configuration following fabrication (for example by being made flexible, segmented and repositionable, etc. an), such as by changing direction of one or more of its longitudinal segments (or equivalent) to cover a desired predetermined area, or to follow a desired geometric contour.

Advantageously, the novel Fiber Waveguide system 100 may be used on conjunction with a proximal flat diffuser (not shown, but may be equivalent to the diffuser 56 of FIG. 1B), to achieve the same effect as the planar Fiber Waveguide system 50, described in connection with FIG. 1B, above. In an alternate embodiment thereof, the Fiber Waveguide system 100 comprises the straight or bent configurable fiber waveguide element 104 that is inserted into a generally spherical (or otherwise three-dimensionally shaped) light diffuser housing, such as an exemplary light diffuser housing 106, such that the resulting system 100 may advantageously serve as a replacement for a standard "screw-in" or "plug-in" light bulb.

It is contemplated by the present invention, that the inventive Fiber Waveguide in various embodiments thereof may also be used in a variety of other applications that benefit from its superb control over the direction, as well as various properties and characteristics of light signals directed thereto—these other applications include, but are not limited to: exacting/precise delivery of light in medical procedures (e.g. for photodynamic therapy or for drug activation, and may be readily configured for use in connection with endoscopic or arthroscopic instrumentation and procedures.

Thus, while there have been shown and described and pointed out fundamental novel features of the inventive apparatus as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A fiber waveguide light extraction system comprising:
an elongated fiber waveguide element having a first end; and
a light source, connected to said first end, operable to emit a light signal into said elongated fiber waveguide element; wherein said elongated fiber waveguide element comprises a longitudinal helical pitch profile selected and configured to achieve substantially uniform light scattering of said light signal passing therethrough.

2. A planar fiber waveguide light extraction system comprising:
at least one elongated fiber waveguide element having a first end;
at least one corresponding light source, connected to said first end of each of said at least one elongated fiber waveguide elements, operable to emit a light signal into each said at least one elongated fiber waveguide element; and
a substantially planar diffuser positioned proximal to said at least one elongated fiber waveguide element, wherein each said at least one elongated fiber waveguide element is positioned proximal to one another, and each comprises a longitudinal helical pitch profile selected and configured to achieve substantially uniform light scattering of said light signal passing therethrough, such that said substantially uniform light scattering of said at least one elongated fiber waveguide element passes through said planar diffuser causing substantially planarly uniform light diffusion therefrom.

3. The fiber waveguide light extraction system of claim 1, wherein said elongated fiber waveguide element comprises a substantially geometrically configurable body and is operable to be selectively configured into at least one predefined geometric form.

4. The fiber waveguide light extraction system of claim 3, further comprising a three dimensional diffuser housing operable to receive said geometrically configured fiber waveguide element.

* * * * *